United States Patent [19]

Geist et al.

[11] Patent Number: 4,539,385
[45] Date of Patent: Sep. 3, 1985

[54] SELF-CROSSLINKING, HEAT-CURABLE GRINDING RESIN

[75] Inventors: Michael Geist, Münster; Günther Ott, Münster-Wolbeck, both of Fed. Rep. of Germany

[73] Assignee: BASF Farben & Fasern AG, Hamburg, Fed. Rep. of Germany

[21] Appl. No.: 620,767

[22] Filed: Jun. 14, 1984

[30] Foreign Application Priority Data

Jun. 24, 1983 [DE] Fed. Rep. of Germany ....... 3322781

[51] Int. Cl.³ .................... C08G 59/14; C08G 59/16
[52] U.S. Cl. .................................. 528/100; 528/110; 528/361; 525/327.3; 525/384
[58] Field of Search .................. 528/100, 110, 361; 525/327.3, 384

[56] References Cited

U.S. PATENT DOCUMENTS

| 4,226,755 | 10/1980 | Knecht | 528/110 X |
| 4,332,711 | 6/1982 | Kooymans et al. | 524/109 X |
| 4,397,990 | 8/1983 | Kooymans et al. | 525/501 X |
| 4,401,774 | 8/1983 | Kooymans et al. | 525/444 X |
| 4,405,662 | 9/1983 | Raudenbusch et al. | 528/110 X |
| 4,423,167 | 12/1983 | Valko | 528/110 X |

Primary Examiner—Earl A. Nielsen
Attorney, Agent, or Firm—Wells & Wells

[57] ABSTRACT

The invention relates to a self-crosslinking heat-curable binder, in particular for electrocoating finishes, based on an organic synthetic resin which contains primary and/or secondary hydroxyl groups, esterified carboxyl groups and quaternary ammonium groups and can be diluted with water as a result of partial or complete neutralization with acids. The esterified carboxyl groups are activated in the alcohol component by a substituent which has a negative inductive effect.

12 Claims, No Drawings

SELF-CROSSLINKING, HEAT-CURABLE GRINDING RESIN

The invention relates to a self-crosslinking, heat-curable binder, in particular for electrocoating finishes, based on an organic synthetic resin which contains primary and/or secondary hydroxyl groups and esterified carboxyl groups and may contain amino groups.

U.S. Pat. No. 3,936,405 and U.S. Pat. No. 3,962,165 describe epoxy resin/amine salt adducts which can be used as grinding resins. However, the disadvantage of these resins is that they are not capable of carrying an external crosslinking agent and do not have a self-crosslinking structure.

On the other hand, German Offenlegungsschrift No. 2,936,411 describes self-crosslinking binders which contain amino groups and esterified carboxyl groups. However, these binders are not optimum grinding resins.

It is an object of the present invention to provide a self-crosslinking binder, in particular for electrocoating finishes, which has very good pigment-wetting properties and can therefore serve as a good grinding resin.

This object is achieved in accordance with the invention, for a binder of the type mentioned at the outset, if the synthetic resin contains 0.8 to 2.0 quaternary ammonium groups per molecule, and if the esterified carboxyl groups in the alcohol component are activated by a substituent which has a negative inductive effect.

This activation is advantageously achieved if the esterified carboxyl groups are $\beta$-hydroxyalkyl ester groups.

In another advantageous embodiment of the invention, the esterified carboxyl groups are $\beta$-alkoxyalkyl ester groups. In this manner, effective activation is also achieved.

The binders according to the invention offer the following advantages: the alcohol components used, i.e. the 1,2-diols in the case of the $\beta$-hydroxyalkyl esters, and the 1,2-diol monoethers in the case of the $\beta$-alkoxyalkyl alkyl esters, result in effective activation of the carboxylic ester groups being achieved. This in turn leads to effective crosslinking in the final film obtained. In this respect, the alcohol components employed according to the invention are superior to the monoalcohols. If monoalcohols, such as methyl, ethyl or butyl alcohol, are used for the esterification of the carboxyl groups, the crosslinking reaction of the binders does not take place to a sufficient extent or takes place too slowly. In this case, the rate of crosslinking is lower, and the baked coating is not sufficiently resistant to solvents. Furthermore, the novel carboxylic ester groups activated in the alcohol component can be prepared in a more advantageous manner than the ester groups containing monoalcohols. For example, the $\beta$-hydroxyalkyl ester groups can be obtained by reacting a carboxyl group with an epoxide compound. These are reactions which can be carried out under mild conditions. As a result, side reactions, such as, for example, transesterifications, are avoided, and a purer product is formed. Another advantage of the binders according to the invention is that the compounds liberated during baking are particularly good leveling agents and produce coatings having a very good surface. Thus, for example, ethylglycol as such is already a known leveling agent, and the invention makes it possible for this compound to be liberated during baking, with the result that a particularly good effect is achieved. In contrast, when low-boiling alcohols are liberated, there is a danger of so-called boilers and other film defects occurring in the coating.

The synthetic resin according to the invention is particularly preferably used as a grinding resin for cathodic electrocoating finishes.

During baking, the activated ester groups react with the hydroxyl groups of the grinding resin, and with any amino groups which may be present therein, to form ester or amide bonds. The activated ester-alcohol is split off in this procedure. The crosslinking mechanism can be illustrated by the following equations:

(a) crosslinking by reaction of the hydroxyl group with the $\beta$-hydroxyalkyl ester group

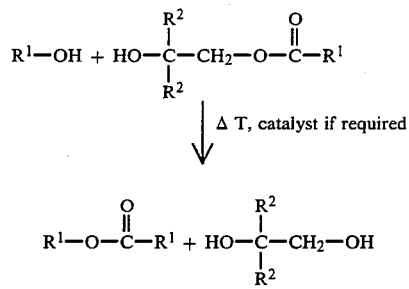

$R^1$ = binder, $R^2$ = H or an organic radical (b) crosslinking by reaction of the hydroxyl group with the $\beta$-alkoxyalkyl ester group

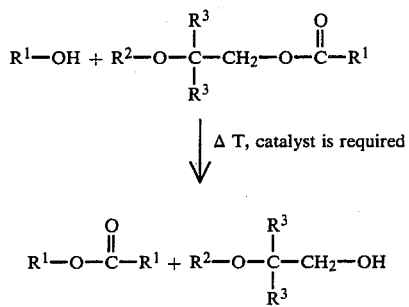

$R^1$ = binder
$R^2$ = alkyl or substituted alkyl
$R^3$ = H or an organic radical.

The diols or diol monoethers which are split off preferably have a boiling point in the proximity of the baking temperature, so that they act as particularly effective leveling agents during the baking process. The ester bond formed during baking has a very advantageous effect on the adhesion of the film, in particular to metal substrates. It also increases the flexibility of the film. This crosslinking mechanism results in the surface coating film being highly resistant to solvents.

Advantageously, the synthetic resin contains 2 to 10 primary and/or secondary hydroxyl groups and 1 to 5 activated ester groups per 1,000 molecular weight units.

The ratio of the number of equivalents of primary and/or secondary hydroxyl groups to that of activated carboxyl ester groups is advantageously 4:1 to 1:2, a ratio of the number of equivalents of about 2:1 being particularly preferred.

The crosslinking reaction can be accelerated by suitable catalysts. Compounds which are particularly suitable for this purpose are ammonium compounds, such as trimethylcetylammonium bromide, and organic tin compounds, such as dibutyl-tin dilaurate and iron(III) acetylacetonate, zinc acetate, zinc 2-ethylhexanoate, cobalt naphthenate, lead acetate, lead octoate and butyl titanate.

The binder is therefore an organic synthetic resin which contains primary and/or secondary hydroxyl groups and activated carboxylic ester groups as reactive groups. If appropriate, reactive amino groups can also be present, in addition to the quaternary ammonium groups used to effect solubilization. Particularly suitable resins for the preparation of the self-crosslinking heat-curable binders according to the invention are epoxide-containing resins which preferably contain terminal epoxide groups from the group comprising the polyglycidyl ethers, the polyglycidyl esters and the polyglycidylamines. Accordingly, the synthetic resin is advantageously prepared by reacting a polyglycidyl ester or ether with a compound which carries two groups which are reactive toward epoxide groups and at least one activated carboxylic ester group to give an intermediate containing terminal epoxide groups, and reacting these epoxide groups with an amine/acid adduct, ring-opening taking place.

For the purposes of this invention, polyglycidyl ethers are preferably understood as meaning those polyglycidyl ethers of the general formula

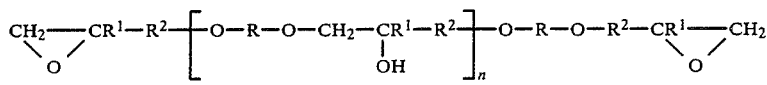

where

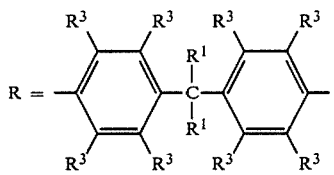

$R^1 = H$ or $C_nH_{2n+1}$
$R^2 = (CR^1_2)_n$
$R^3 = R^1$, halogen and preferably H
$n = 0$ to 10.

The polyglycidyl ethers of the general formula shown have a number average molecular weight of about 340 to 5,000 and accordingly have an epoxide equivalent weight of 170 to 2,500. The epoxy resins can also be hydrogenated or partially hydrogenated. To control the film properties, some or all of the reactive groups of the epoxy resin can be reacted with other compounds. Compounds which can be used for this purpose are:

(a) Carboxyl-containing compounds, such as saturated or unsaturated monocarboxylic acids, aliphatic, cycloaliphatic and/or aromatic dicarboxylic acids of various chain lengths, hydroxyalkylcarboxylic acids and carboxyl-containing polyesters, or (b) Amino-containing compounds, such as diethylamine or ethylhexylamine or diamines containing secondary amino groups, polyaminoamides, such as versamides or the reaction product of one mole of diaminohexane with two moles of monoglycidyl ethers or monoglycidyl esters, especially glycidyl esters or β-branched fatty acids, such as versatic acid, or (c) Hydroxyl-containing compounds, such as neopentylglycol, bis-ethoxylated neopentylglycol, neopentylglycol hydroxypivalate, hexane-1,6-diol, 1,4-bis-(hydroxymethyl)cyclohexane, trimethylolpropane or aminoalcohols, such as triethanolamine or methyldiethanolamine, or hydroxyl-containing alkylketimines, such as aminomethylpropane-1,3-diol methyl isobutyl ketimine, as well as polyglycol ethers, polyesterpolyols, polyether-polyols and polycaprolactone-polyols of various functionalities and molecular weights.

Instead of the polyglycidyl ethers based on bisphenol A, it is also possible to use polyglycidyl ethers based on other components, such as triglycidyl isocyanurate, heterocyclic diglycidyl compounds or diglycidylhydantoins.

Suitable polyglycidyl esters are reaction products of, for example, bisglycidyl terephthalate or bisglycidyl isophthalate with, for example, bisphenol A or the component carrying the activated ester group. The epoxide equivalent weight of these products is between 200 and 2,500. To control the film properties, some of the remaining reactive glycidyl groups can be reacted with other compounds. Compounds which are suitable for this purpose are those mentioned above under a, b and c.

Polyglycidylamines are understood as meaning those glycidyl-containing resins which are obtained by introducing glycidyl groups, via, for example, epichlorohydrin, into resins possessing NH2 functional groups.

Partially epoxidized polybutadienes are likewise suitable for modification with amino-containing compounds and compounds containing β-hydroxyalkyl ester groups or β-alkoxyalkyl ester groups.

Partially epoxidized polybutadiene oils are understood here as meaning reaction products which are obtained by reacting commercially available polybutadiene oils with peracids or mixtures of an organic acid with H2O2. The method of preparation is described in, for example, Chemiker-Zeitung 95, 857 et seq. (1971).

Other preferred compounds are copolymers of acrylates and/or methacrylates, which contain, for example, acrylic acid and/or glycidyl methacrylate or another olefinically unsaturated polymerizable compound carrying a glycidyl group, and β-hydroxyalkyl esters of acrylic and/or methacrylic acid or a β-alkoxyalkyl acrylate and/or a β-alkoxyalkyl methacrylate. The glycidyl groups are modified with the amine/acid adducts, in a further reaction step.

The copolymers preferably have a number average molecular weight of 700 to 15,000. Preferred monomers are acrylates and methacrylates where the alcohol radical is of 1 to 8 carbon atoms. However, the copolymers can also contain other monomers, such as acrylamide, methacrylamide or styrene. Copolymerization is carried out in a well-known manner, by solution, suspension or emulsion polymerization with the addition of initiators, such as peroxides, hydroperoxides, per-esters or thermolabile azo compounds, and, if appropriate, molecular weight regulators.

The ionic groups of the grinding resin, which are required on the one hand to make the grinding resin compatible with water and on the other hand to permit adsorption onto the pigment, are introduced by means of an organic tertiary amine/acid salt. These organic tertiary amine/acid salts are capable of undergoing reaction, with opening of the epoxide groups, to give quaternary ammonium-containing reaction products. The amine of the amine/acid adduct can be an aliphatic, cycloaliphatic or araliphatic amine. The acid of the amine salt can be an inorganic acid, but organic acids, such as acetic acid or lactic acid are preferred, lactic acid being particularly preferred.

When the resin is used according to the invention as a grinding resin for the preparation of a pigment paste, the proportions of the epoxy-containing organic material and of the organic tertiary amine, which are reacted with one another, are preferably chosen so that the base resin contains 0.8 to 2.0 nitrogen atoms per molecule. Smaller amounts of quaternary nitrogen can lead to poor wettability of the pigment, whereas larger amounts result in the resins being too water-soluble.

Reactive groups, in particular hydroxyl groups, can be introduced simultaneously via the organic tertiary amine/acid adducts. Hence, tertiary alkanolamines are preferably used for the preparation. These include, for example, diethylethanolamine, methyldiethanolamine, triethanolamine, diethylethanolamine, dibutylethanolamine, butyldiethanolamine, dimethylisopropanolamine, methyldiisopropanolamine, cyclohexyldiisopropanolamine, dimethylpropanolamine, dimethylpentanolamine and 3-(dimethylamino)-benzyl alcohol.

The introduction of additional amino groups into the organic resin is preferably carried out by reacting a polyamine and/or an amino-containing and/or hydroxyl-containing ketimine with resins which contain, per molecule, at least one epoxide group or isocyanate group or another suitable reactive group. However, a binder containing reactive amino groups can also be obtained by other addition reactions, for example by esterification or amidation of compounds carrying primary and/or secondary amino groups with resins containing groups suitable for this purpose.

Compounds which are particularly suitable for introducing the activated ester groups into the binder are those which possess one or more carboxylic acid groups in addition to other reactive groups which make incorporation into the binder possible. The carboxylic acid group can be converted, either before or after incorporation into the binder, into the desired β-hydroxyalkyl ester group or β-alkoxyalkyl ester group. Compounds which are capable of undergoing these reactions are, for example, dihydroxymonocarboxylic acids, such as 2,2-bis-(hydroxymethyl)-propionic acid, 4,4-(4,4'-bis-hydroxyphenyl)-valeric acid or 3,5-dihydroxybenzoic acid, dihydroxydicarboxylic acids, such as tartaric acid or 1,1-methylenebis-(2-hydroxy-3-naphthoic acid), and aminocarboxylic acids, such as 11-aminoundecanoic acid, 3-aminopropionic acid or 4-aminobenzoic acid.

These compounds which contain activated ester groups can be reacted, via their reactive groups, in particular via hydroxy or amino groups, with reactive groups in the resin binder. For this purpose, the resin binder preferably possesses epoxide groups.

The pigment pastes are prepared in accordance with the invention by comminuting or dispersing a pigment in the grinding resin in a well-known manner. The pigment paste contains, as essential components, the grinding resin possessing the quaternary ammonium groups and at least one pigment. However, other conventional additives, such as plasticizers, wetting agents, surfactants or antifoams, can also be present in the pigment composition.

The pigments are milled as a rule in ball mills, sand mills, Cowles mills and continuous milling apparatuses, until the pigment has been comminuted to the desired particle size and has preferably been wet by the resin or dispersed therein. After the comminution process, the particle size of the pigment should be about 10 microns or smaller. In general, comminution is carried out until a Hegman fineness of about 6 to 8 is achieved. Milling is preferably carried out in an aqueous dispersion of the grinding resin. The amount of water present in the material to be milled should be sufficient to form a continuous aqueous phase.

The well-known pigments can be used as pigments in the invention. In general, titanium dioxide is the sole or principal white pigment. Other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate can also be used. Examples of colored pigments which can be used are cadium yellow, cadmium red, carbon black, phthalocyanine blue, chromium yellow, toluidine red and hydrated iron oxide. Regarding further general information about the comminution of pigments and the formulation of coating materials, reference is made to the following books:

D. H. Parker, Principles of Surface Coating Technology, Interscience Publishers, New York (1965), R. L. Yates, Electropainting, Robert Draper Ltd., Teddington, England (1966), and H. F. Payne, Organic Coating Technology, Volume 2, Wiley and Sons, New York (1961).

Completion of the pigment paste to give an electrocoating finish is carried out using known binder dispersions or aqueous binder solutions, which are described in, for example, the following patents or Offenlegungsschriften: German Pat. No. 2,701,002, EP No. 12 463 B1, EP No. 4090, German Offenlegungsschrift No. 3,103,642 or German Offenlegungsschrift No. 3,215,891.

In the completion procedure, a sufficient amount of the pigment paste according to the invention is employed so that the ready-prepared surface coating bath which can be deposited electrically possesses the properties required for the deposition. In most cases, the surface coating bath has a ratio of pigment to binder (electrically depositable resin from the binder dispersion or binder solution and grinding resin in the pigment paste) of 0.05 to 0.5.

Surface-coating baths which can be deposited electrically can contain, in addition to the pigment paste and the electrically depositable resin, conventional additives, such as additional solvents, antioxidants, surfactants and other typical additives for the electrical deposition of resins.

The solids content of a deposition bath which is made up with the pigment paste according to the invention is 7–35 parts by weight, preferably 12–25 parts by weight. The pH of the deposition bath is between 4 and 8, preferably between 5 and 7.5. Non-corroding steel anodes or graphite anodes are used as the anodes of the deposition bath. The temperature of the bath should be between 15° and 35° C., preferably between 20° and 30°.

The deposition time and voltage are chosen so that the desired film thickness is obtained.

After the deposition process, the coated article is rinsed, and is ready for baking.

Regardless of the method of application of the coating agent based on the binder according to the invention, crosslinking of the surface coating film during baking is carried out at temperatures of 130° to 200° C. for a period of 10–60 minutes, preferably at 150° to 180° C. for 15–30 minutes.

The invention also relates to a process for the preparation of a grinding resin, in particular for electrocoating finishes, wherein a polyglycidyl ester or ether is reacted with a compound which carries groups which are reactive toward epoxide groups and at least one carboxylic ester group which is activated in the alcohol component by a substituent which has a negative inductive effect to give an intermediate possessing epoxide groups, and these epoxide groups can be reacted with an amine/acid adduct, ring-opening taking place.

The invention furthermore relates to the use of the grinding resins for the preparation of electrocoating baths for the electrocoating process.

The invention furthermore relates to a process for the production of coatings, in which an electrically conductive substrate is immersed in an aqueous electrocoating bath which contains grinding resin based on an organic synthetic resin possessing quaternary nitrogen groups and esterified carboxyl groups, and is made the cathode, a film is deposited onto the substrate by means of direct current, the substrate is removed from the bath and the film is hardened by baking to give a coating, wherein the esterified carboxyl groups of the synthetic resin are activated in the alcohol component by a substituent which has a negative inductive effect, and are reacted with hydroxyl groups and, where relevant, amino groups, in the course of baking.

The invention finally also relates to a coated substrate which has been produced by the process described.

The invention is illustrated in more detail below by means of Examples.

EXAMPLES

Intermediate 1

Preparation of
2-hydroxy-3-(1-oxo-2-methyl-2-ethylheptyloxy)-propyl 4,4-(4,4'-dihydroxydiphenyl)-pentanoate 3,810 g of 4,4-(4,4'-dihydroxydiphenyl)-pentanoic acid, 3,855 g of glycidyl 2-methyl-2-ethylheptanoate and 1,897 g of cyclohexanone are initially taken in a 10 l reaction vessel equipped with a reflux condenser, a stirrer and an internal thermometer. 19 g of a Cr-containing catalyst are added. The reaction mixture is heated to 90° C., and is kept at this temperature until the acid number has decreased to 1 and the epoxide content is 0.3%. The solids content is 80% of 2-hydroxy-3-(1-oxo-2-methyl-2-ethylheptyloxy)-propyl 4,4-(4,4'-dihydroxydiphenyl)-pentanoate.

Intermediate 2

Preparation of 2-ethoxyethyl 2,2-bis-(hydroxymethyl)-propionate 3,225 g of ethylglycoL, 960 g of 2,2-bis-(hydroxymethyl)-propionic acid and 215 g of xylene are initially taken in a suitably equipped 5 l reactor, and 36 g of acidic ion exchanger are added. The reaction mixture is brought to the boil, and the water formed is separated off azeotropically. When water no longer passes over, 500 g of xylene/ethylglycol mixture are distilled off. The ion exchanger is then filtered off, and the excess ethylglycol and residual xylene are stripped off under reduced pressure.

Preparation of grinding resin 1

1,172 g of epoxy resin based on bisphenol A (epoxide equivalent weight 188) and 1,068 g of intermediate 1 are initially taken in a 5 l reactor. The mixture is heated, and is kept at 165° C. for 30 minutes. It is then cooled to 110° C., and 1,454 g of butylglycol are added. The temperature is brought to 80° C., and 460 g of a reaction product obtained from methyldiethanolamine and 88% strength aqueous lactic acid (molar ratio 1:1.005) are added. The temperature is maintained until the acid number reaches 1.0. The solids content is then adjusted with 346 g of butylglycol (60%).

Preparation of grinding resin 2

1,583 g of epoxy resin based on bisphenol A (epoxide equivalent weight 188) and 650 g of intermediate 2 are initially taken in a 5 l reactor. The mixture is heated to 125° C. 8 g of dimethylbenzylamine are then added, and after the exothermic reaction has taken place the temperature is kept at 130° C. until an epoxide equivalent weight of 1,035 is reached. The mixture is then cooled rapidly to 110° C., and 1,454 g of butylglycol are added. The temperature is brought to 80° C., after which 466 g of a reaction product obtained from methyldiethanolamine and 88% strength aqueous lactic acid (molar ratio 1 : 1.005) are added. The temperature is kept at 80° C. until the acid number is less than 1. The solids content is then adjusted with 347 g of butylglycol (60%).

Preparation of the pigment pastes 1,800 parts of the grinding resin and 2,447 parts of deionized water are initially taken and are mixed with 2,460 parts of $TiO_2$, 590 parts of an extender based on aluminum silicate, 135 parts of lead silicate and 37 parts of carbon black. This mixture is then comminuted in a ball mill to a Hegman fineness of 5–7. 1,255 parts of deionized water are then added in order to obtain the desired paste consistency.

The two grinding resins are processed in the same manner to give pigment pastes.

Grinding resin 1 = pigment paste 1
Grinding resin 2 = pigment paste 2 .

Preparation of a binder dispersion (a) Crosslinking agent 4,272 g of a reaction product of pentaerythritol and caprolactone (molar ratio 1 : 4) are initially taken, together with 5,304 g of trimellitic anhydride, in a suitably equipped 20 l reactor, and the mixture is heated to 160° C. As soon as an acid number of 338 is reached, the mixture is cooled, and the addition of 2,000 g of methyl isobutyl ketone (MIBK) is started slowly at 146° C. As a result of the addition, the temperature drops further. 124 g of a catalyst based on a chromium salt are then added at 109° C., and the mixture is further diluted with 3,000 g of MIBK. The temperature is then kept at 95° C., and the addition of butylene oxide is started. The addition of butylene oxide is continued until the acid number has fallen below 2.

Characteristic values:
Solids content: 74.4% (130° C., 60 min)

Acid number: 1.86.

(b) Binder 1,360 g of a commercially available epoxy resin based on bisphenol A (EEW 188), 301 g of 2,2-dimethylpropane-1,3-diol and 83 g of xylene are initially taken in a suitably equipped 5 l reactor, and are heated. 11 g of dimethylbenzylamine are added at 123° C. After the exothermic reaction, the temperature is kept at 135° C. until an epoxide equivalent weight of 1,110 is reached. The mixture is then cooled to 90° C., and a mixture of 121 g of diethanolamine and 106 g of diethylenetriaminebismethylisobutylketimine, 72% strength in methyl isobutyl ketone, is added. When the exothermic reaction is complete, the mixture is kept at 115° C. for 1 hour. 162 g of propylene glycol monophenyl ether, 72 g of lead octoate and 744 g of crosslinking agent 1 are then mixed in.

In the meantime, a dispersing bath consisting of 2,410 g of deionized water, 43 g of glacial acetic acid and 48 g of an emulsifier solution is prepared. The acid number of this bath is 16.6. The resin is dispersed in this bath. After one hour, a further 1,539 g of deionized water are added.

The dispersion is then heated to 50° C. under reduced pressure, and 250 g of organic phase are separated off during this procedure. Application of the vacuum is then discontinued, and the dispersion is filtered.

Characteristic data of dispersion 3
  Solids content: 35.5% (30 min, 150° C.)
  pH: 6.8
  meq acid: 0.315
  meq base: 0.668.

This binder dispersion is very suitable for testing the pigment pastes.

Preparation of the electrocoating baths

Surface coating baths are prepared from the binder dispersion described above and the gray pigment pastes described above.

This is done using the following:
2,280 parts of deionized water,
25 parts of 10% strength acetic acid,
1,920 parts of binder dispersion and
775 parts of pigment paste.

The surface coating films are deposited in the course of 120 seconds at a bath temperature of 26° C. For this purpose, zinc-phosphatized metal sheets are made the cathode, and are coated. Hardening of the deposited films is carried out for 20 minutes at 185° C. in a through-circulation drier.

Results for the deposition

The results for the deposition are summarized in the tables below.

| Deposition data | | |
| --- | --- | --- |
| Pigment paste | 1 | 2 |
| Deposition voltage | 310 | 290 |
| Film thickness (μm) | 18 | 19 |

| Characteristic mechanical technological data | | |
| --- | --- | --- |
| Pigment paste | 1 | 2 |
| Erichsen deep-drawing value (mm) | 6.7 | 6.3 |
| Crosshatch test* | 0 | 0 |
| Bending test | satisfactory | satisfactory |
| Impact (inch-pound) | 50 | 40 |

*0 = best value, 5 = poorest value

We claim:

1. A self-crosslinking, heat-curable binder, in particular for electrocoating finishes, based on an organic synthetic resin which contains primary and/or secondary hydroxyl groups and esterified carboxyl groups and may contain amino groups, wherein the synthetic resin contains 0.8 to 2.0 quaternary ammonium groups per molecule, and the esterified carboxyl groups are activated in the alcohol component by a substituent which has a negative inductive effect.

2. A binder as claimed in claim 1, wherein the esterified carboxyl groups are β-hydroxyalkyl ester groups.

3. A binder as claimed in claim 1, wherein the esterified carboxyl groups are β-alkoxyalkyl ester groups.

4. A binder as claimed in claim 1, wherein the synthetic resin contains 2 to 10 primary and/or secondary hydroxyl groups and 1 to 5 activated ester groups per 1,000 molecular weight units.

5. A binder as claimed in claim 1, wherein the ratio of the number of equivalents of primary and/or secondary hydroxyl groups to that of activated carboxylic ester groups is 4:1 to 1:2.

6. A binder as claimed in claim 1, wherein the synthetic resin is an epoxy resin which is prepared by reacting a polyglycidyl ester or ether with a compound which carries two groups which are reactive toward epoxide groups and at least one activated carboxylic ester group to give an intermediate possessing terminal epoxide groups, and reacting these epoxide groups with a salt of a tertiary amine, ring-opening taking place.

7. A process for the preparation of a binder, in particular for electrocoating finishes, wherein a polyglycidyl ester or ether is reacted with a compound which carries two groups which are reactive toward epoxide groups and at least one carboxylic ester group which is activated in the alcohol component by a substituent which has a negative inductive effect to give an intermediate possessing terminal epoxide groups, and these epoxide groups are reacted with a salt of a tertiary amine, ring-opening taking place.

8. A process as claimed in claim 7, wherein a compound possessing at least one β-hydroxyalkyl ester group is used.

9. A process as claimed in claim 7, wherein a compound possessing a β-alkoxyalkyl ester group is used.

10. A process as claimed in claim 7, wherein the molar ratios of the starting materials used are chosen so that a binder containing 2 to 10 primary and/or secondary hydroxyl groups per 1,000 molecular weight units is obtained.

11. A process as claimed in claim 7, wherein the molar ratios of the starting materials are chosen so that, in the binder obtained, the ratio of the number of equivalents of primary and/or secondary hydroxyl groups to that of activated carboxylic ester groups is from 4:1 to 1:2.

12. The binder of claim 1, further comprising a grinding resin in the preparation of electrocoating baths for the electrocoating process.

* * * * *